(12) United States Patent
Polutnik

(10) Patent No.: US 8,381,847 B2
(45) Date of Patent: Feb. 26, 2013

(54) UNICYCLE

(76) Inventor: Aleksander Polutnik, Lesicno (SI)

( * ) Notice: Subject to any disclaimer, the term of this patent is extended or adjusted under 35 U.S.C. 154(b) by 221 days.

(21) Appl. No.: 12/736,232

(22) PCT Filed: Mar. 18, 2009

(86) PCT No.: PCT/SI2009/000012
§ 371 (c)(1),
(2), (4) Date: Nov. 15, 2010

(87) PCT Pub. No.: WO2009/120157
PCT Pub. Date: Oct. 1, 2009

(65) Prior Publication Data
US 2011/0056757 A1   Mar. 10, 2011

(30) Foreign Application Priority Data
Mar. 26, 2008   (SI) ................. P-200800064

(51) Int. Cl.
*B62D 61/00*   (2006.01)

(52) U.S. Cl. .......... 180/65.1; 180/21; 280/205

(58) Field of Classification Search ............ 180/21, 180/65.1; 280/200, 205, 210
See application file for complete search history.

(56) References Cited

U.S. PATENT DOCUMENTS

| 3,399,742 | A  | * | 9/1968  | Malick ......................... 180/21 |
| D273,287  | S  | * | 4/1984  | Evans ......................... D12/107 |
| 7,004,271 | B1 | * | 2/2006  | Kamen et al. .................. 180/21 |
| 7,537,228 | B2 | * | 5/2009  | Shimizu et al. ............... 280/205 |
| 2006/0279057 | A1 | | 12/2006 | Shimizu et al. ............... 280/205 |

FOREIGN PATENT DOCUMENTS

| DE | 97326    | 10/1897 |
| JP | 48033485 | 4/1973  |
| JP | 56089788 | 7/1981  |

* cited by examiner

*Primary Examiner* — John Walters
(74) *Attorney, Agent, or Firm* — Jacobson Holman PLLC

(57) ABSTRACT

A unicycle having a lower part with a wheel, a drive and a fork, in the branched end of which the wheel is rotatably mounted. An upper part of the unicycle includes a seat and a support frame. The lower part and the upper part are connected by a rotational connection, enabling the rotational movement of the upper part of the unicycle relative to the lower part. The unicycle is therefore easier to steer and to balance.

13 Claims, 3 Drawing Sheets

UNICYCLE

Figure 1:
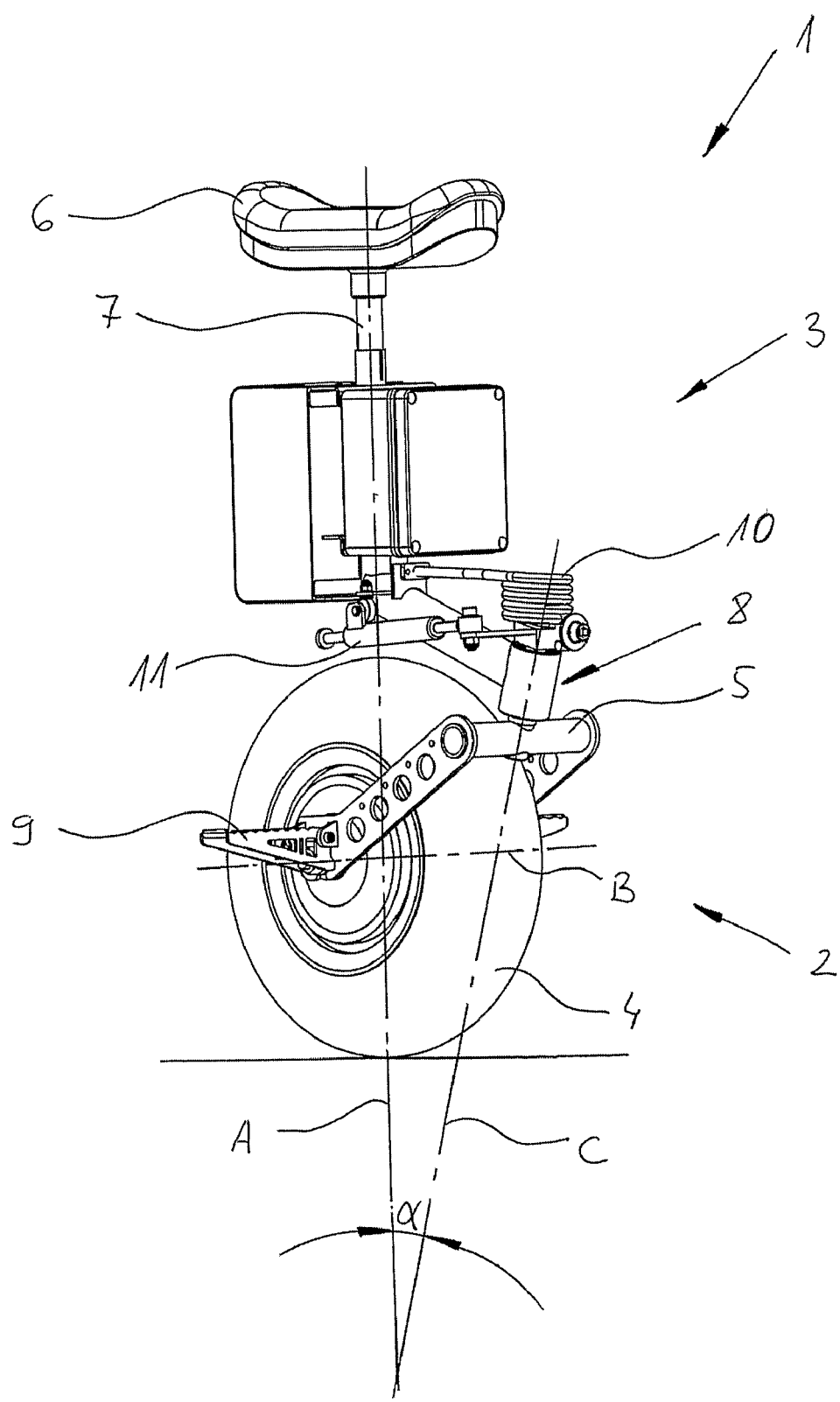

This is a national stage of PCT/SI09/000012 filed Mar. 18, 2009 and published in English, which has a priority of Slovenia no. P-200800064 filed Mar. 26, 2008, hereby incorporated by reference.

Technical Field

The present invention relates to a unicycle with a motor drive for transportation of a person.

State of the Art

Unicycles have been known for a long time. The main characteristic of unicycles lies in that the contact between the riding surface and the wheel of a unicycle is essentially single-point. Riding a unicycle is very demanding, because the user has to balance it in two dimensions:
  in the riding direction
  transversally to the riding direction.

Riding such unicycle calls for much skill and training and this is the reason unicycles are often seen in circus performances. A typical user needs at least a month to master riding a unicycle.

First known unicycles were feet driven by means of pedals. Riding such unicycle is straining and tiresome, yet the velocity achieved is low.

Later unicycles with a motor drive (electromotor or internal combustion engine) and a corresponding control system were developed, said control system being intended to balance the unicycle in the riding direction. Such solution is disclosed in U.S. Pat. No. 3,399,742. The invention comprises a motor drive, a gyroscope serving to generate an electrical signal proportional to the decline of the unicycle's axis from the vertical, and a corresponding electronic control circuit that receives an electric signal from the gyroscope thus controlling the torque or the speed of the motor drive respectively. A user of the unicycle accelerates the vehicle by leaning his body forward. By leaning the body backwards the speed of the unicycle decreases.

As a unicycle is dynamically unstable in both the longitudinal and transversal directions, the control of such system is relatively complicated. With the development of microprocessors and sensors, the problem of longitudinal balancing has been mastered.

Although the problem of longitudinal balancing of a unicycle was satisfactorily solved by the above mentioned solutions, the problem of transversal balancing of a unicycle remains unsolved. Riding such unicycle is not much easier, because maintaining transversal balance is very demanding. Transversal balancing during a ride of a unicycle is achieved by turning. The user has two possibilities for turning the unicycle:
  by leaning his body in the direction transversal to the riding direction, and
  by twisting his body.

The first of the two possibilities is less demanding as to the implementation, yet can be performed only at higher speeds of the unicycle. Turning by twisting the body can be archived in a way that the user twists his upper part of the body to one direction, wherein the unicycle is turned to the other direction. This kind of turning requires much skill and training.

Technical Problem

A technical problem is how to assure a unicycle that is easy to balance in the direction transversal to the riding direction, that will be easier to turn and therefore easier to steer and will thus require less time for a user to master it.

Solution to the Technical Problem

A unicycle according to the present invention comprises:
  a lower part of the unicycle, which further comprises a wheel with a drive means that can be an electromotor, an internal combustion engine or any other kind of drive, and a fork, in the branched end of which a wheel is rotatably mounted, and
  an upper part of the unicycle, which further comprises a seat and a support frame.

Between the lower end of the support frame of the upper part of the unicycle and the unbranched end of the fork of the lower part of the unicycle a rotational connection is arranged enabling rotational movement of the upper part of the unicycle relative to the lower part. Said connection is formed as a plain bearing, a roller bearing or in any other known manner.

By riding the unicycle at constant speed the median of the unicycle substantially intersects the central axis of the wheel and forms an angle of 0° to 90°, preferably of 0° to 45°, even more preferably of 15° to 25° with the axis of the rotational connection. The intersection of the median of the unicycle and the axis of the rotational connection lies preferably underneath the surface of riding.

Turning means is provided for the user to achieve the turning of the upper part of the unicycle relative to the lower part. Turning means is connected to the lower part of the unicycle. Turning means can be connected to the lower part of the unicycle in a fixed manner or by means of a mechanism.

Between the lower part and the upper part of the unicycle a spring element is arranged, whose one end is firmly connected with the upper part of the unicycle and the other end is firmly connected with the lower part of the unicycle.

Between the lower part and the upper part of the unicycle a damper element is arranged, whose one end is firmly connected with the upper part of the unicycle and the other end is firmly connected with the lower part of the unicycle.

The unicycle is provided with any kind of known gyroscope and a respective electric control system that enable balancing of the unicycle in the riding direction.

After the drive with the system for longitudinal balancing is switched on, the user sits on the unicycle and by leaning forward achieves the acceleration of the unicycle. Due to acceleration the body sets to the upright position. By leaning the body backwards, the speed of the unicycle starts to decrease and as a result the body sets to the upright position again. The user can thus change the speed of the unicycle and at the same time the balancing in the riding direction is achieved.

The user achieves the turning of the lower part of the unicycle relative to the upper part by applying force to the turning means. The wheel slightly leans. Physical background of the forces involved (gravity force, centrifugal force etc.) in riding the unicycle according to the present invention is very similar to that of riding a bicycle. The user applies force to the turning means in two cases:
  when he wants to achieve the turning of the unicycle
  when he balances the unicycle in the direction transversal to the riding direction.

The turning means can be activated by the force of feet or arms. The force applied to the turning means causes the turning of the lower part of the unicycle relative to the upper part.

As the user ceases to apply force to the turning means, the spring element mutually aligns the lower part and the upper part of the unicycle. The task of the damper element is to damp vibrations thus increasing the stability of riding the unicycle.

In comparison with the previously known solutions, the advantage of the present invention lies in easier turning of the unicycle and in easier balancing in the direction transversal to the riding direction. A practical consequence thereof is that the user learns to ride such unicycle in a substantially shorter time. The unicycle becomes more interesting for a broader circle of users and can even replace a car or other transporting means on short distances in urban districts.

Figure 2:
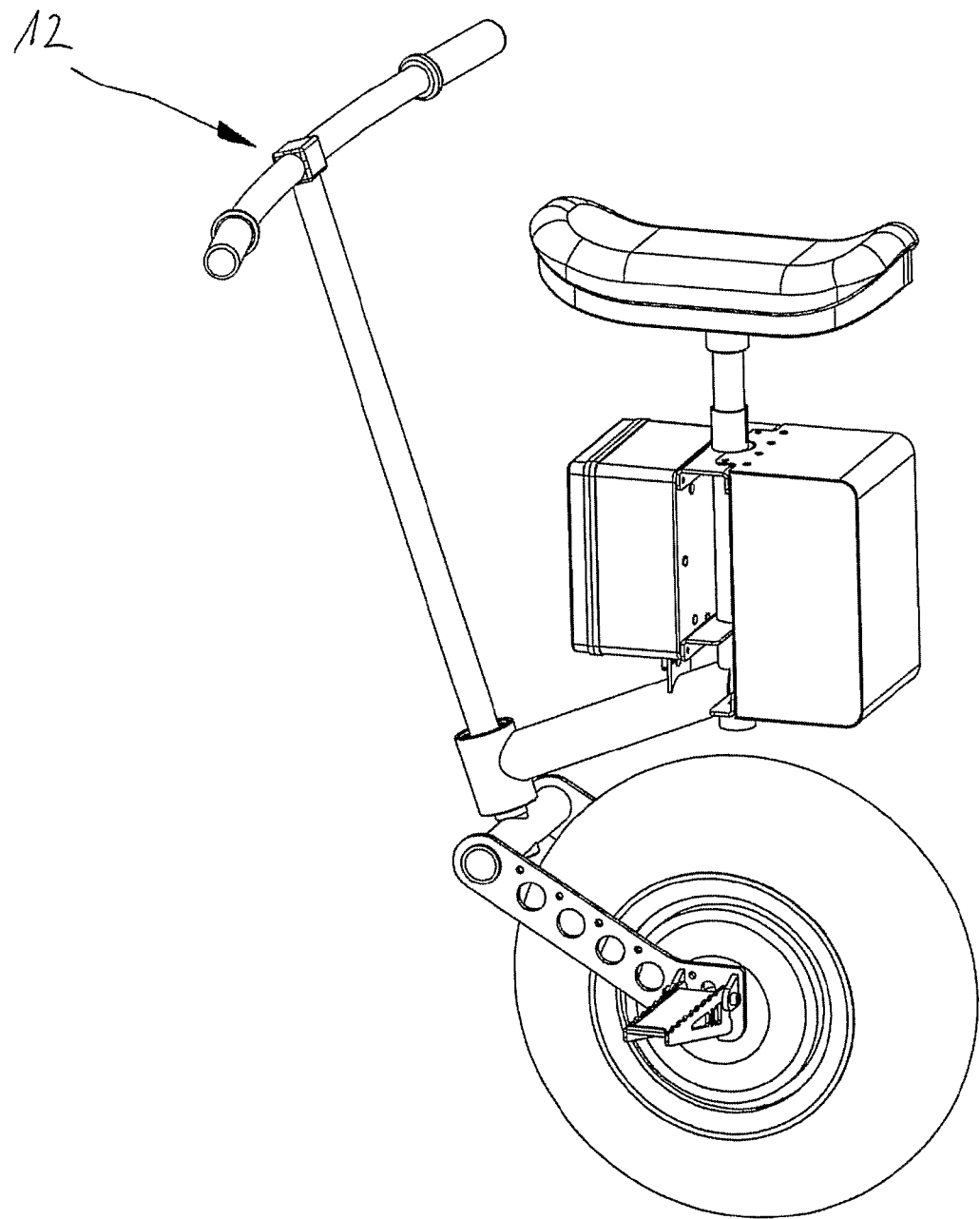
Figure 3:
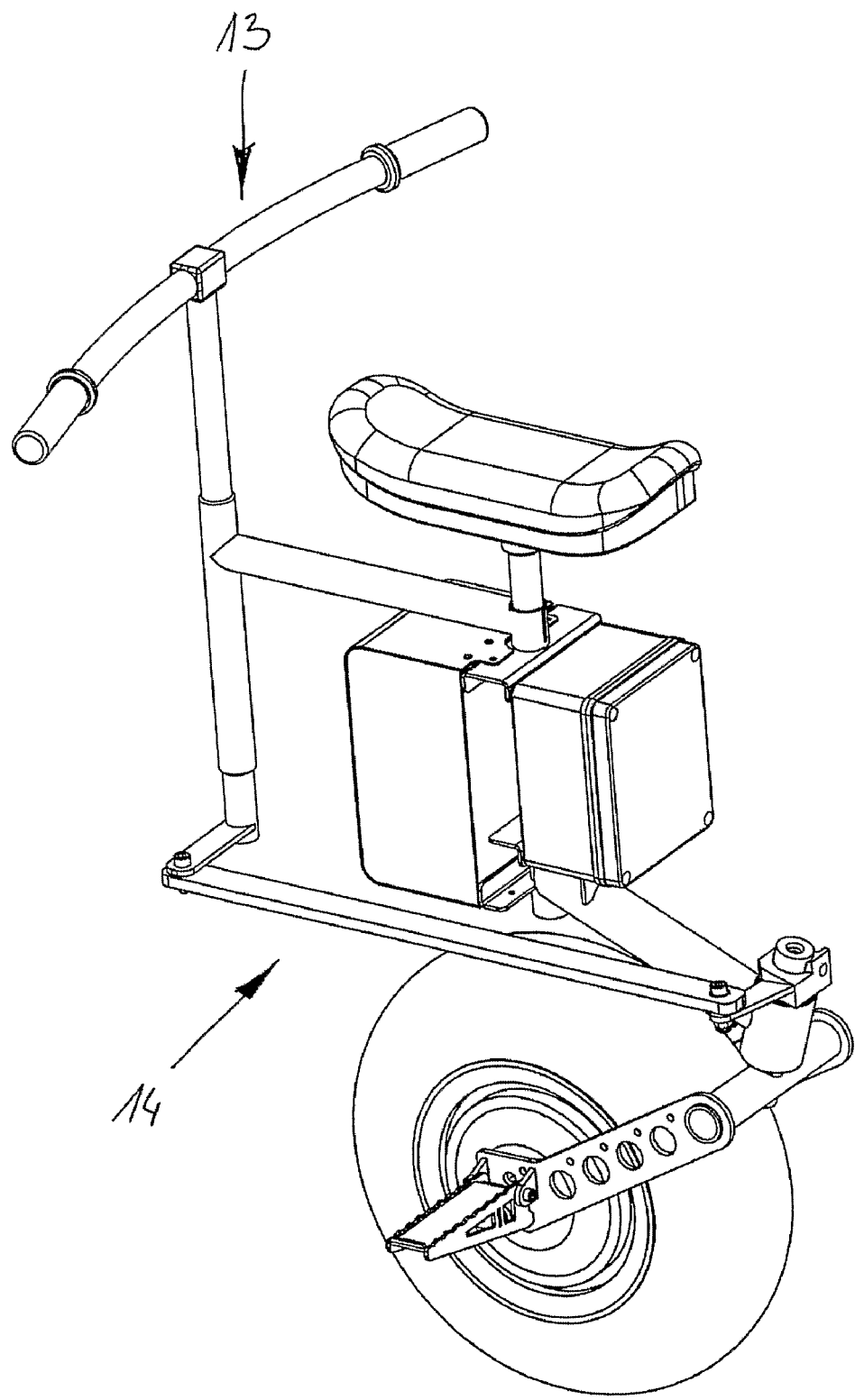

FIG. 1: Unicycle
FIG. 2: Unicycle with a handlebar
FIG. 3: Unicycle with a handlebar with crank mechanism A unicycle 1 according to the present invention comprises:
  a lower part 2 of the unicycle 1, which further comprises a wheel 4 with a drive means, which can be an electromotor integrated into the wheel 4, and a fork 5, in the branched end of which is rotatably mounted the wheel 4, and
  an upper part 3 of the unicycle 1, which further comprises a seat 6 and a support frame 7. Between the lower end of the support frame 7 of the upper part 3 of the unicycle 1 and the unbranched end of the fork 5 of the lower part 2 of the unicycle 1 a rotational connection 8 is arranged enabling the rotational movement of the upper part 3 of the unicycle 1 relative to the lower part 2.

Said connection is preferably formed as a bearing, which can be a plain bearing or a roller bearing.

By riding the unicycle 1 at constant speed, the median A of the unicycle substantially intersects the axis B of the wheel 4 and forms an angle α of 0° to 90°, preferably of 0° to 45°, even more preferably of 15° to 25° with the axis C of the rotational connection 8. The intersection of the median A of the unicycle 1 and the axis C of the rotational connection 8 lies preferably underneath the surface of riding.

A turning means is provided for the user to achieve the turning of the upper part 3 of the unicycle 1 relative to the lower part 2. The turning means is connected to the lower part 2 of the unicycle 1.

The turning means of the first embodiment is formed as a pair of pedals 9 arranged on the fork 5 substantially along the axis B of the wheel 4, one on each side of the wheel 4 of the unicycle 1. The pedals 9 are firmly connected to the lower part 2 of the unicycle 1.

The turning means of the second embodiment is formed as a handlebar 12 arranged in the axis C of the rotational connection 8. The handlebar 12 is firmly connected to the lower part 2 of the unicycle 1.

The turning means of the third embodiment is formed as a handlebar 13 arranged offset to the axis C of the rotational connection 8 and by means of the crank mechanism 14 connected with the unbranched end of the fork 5 of the lower part 2 of the unicycle 1.

In the second and the third embodiment the pair of pedals 9 arranged on the fork 5 serves only to support the feet, not to steer the unicycle 1.

Between the lower part 2 and the upper part 3 of the unicycle 1 a spring element is arranged that is formed as a torque spiral spring 10 with one end firmly connected with the upper part 3 of the unicycle 1 and with the other end firmly connected with the lower part 2 of the unicycle 1.

Between the lower part 2 and the upper part 3 of the unicycle 1 a damping element is arranged that is formed as a fluid damper 11 with one end firmly connected with the upper part 3 of the unicycle 1 and with the other end firmly connected with the lower part 2 of the unicycle 1.

The unicycle 1 is provided with any kind of known gyroscope and a respective electric control system that enable balancing of the unicycle in the riding direction.

After the drive with the system for longitudinal balancing is switched on, the user sits on the unicycle 1 and achieves the acceleration of the unicycle 1 by leaning his body forward. Due to acceleration the body sets to the upright position. By leaning his body backwards, the speed of the unicycle 1 starts to decrease and as a result the body sets to the upright position again. The user can thus change the speed of the unicycle 1 and at the same time the balancing in the riding direction is achieved.

The user applies force to the turning means 9, 12, 13 to achieve the turning of the lower part 2 of the unicycle 1 relative to the upper part 3. In the same manner the user balances the unicycle 1 in the direction transversal to the riding direction.

The turning means of the first embodiment is formed as a pair of pedals 9. The user acts on the pedals 9 directly by the force of his feet. For turning left/right the user presses the left/right pedal 9 with the left/right foot down.

The turning means of the second and the third embodiment is formed as a handlebar 12, 13. The user acts on the handlebar 12, 13 directly by the force of his arms. For turning left/right the user turns the handlebar 12, 13 to the left/right by hands.

As user ceases to apply force to the turning means 9, 12, 13, the spiral spring 10 aligns the lower part 2 and the upper part 3 of the unicycle 1 to each other. The task of the damper 11 is to damp vibration and to increase the stability in riding the unicycle 1.

The invention claimed is:

1. A unicycle comprising
  a lower part having a wheel with a drive means and a fork, in a branched end of the fork said wheel being rotatably mounted,
  an upper part having a seat and a support frame,
  a connection between a lower end of the support frame and an unbranched end of the fork, said connection being between the lower part and the upper part as a rotational connection,
  a median of the unicycle substantially intersecting an axis of the wheel, the median of the unicycle forming with an axis of the rotational connection an angle (α) which is $0°<\alpha\leqq90°$, and the intersection of the median of the unicycle and the axis of the rotational connection lying underneath a surface of riding.

2. The unicycle according to claim 1, wherein on the lower part a turning means is arranged to turn the lower part relative to the upper part.

3. The unicycle according to claim 2, wherein the turning means is formed as a pair of pedals arranged on the fork substantially along the axis of the wheel, one on each side of the wheel.

4. The unicycle according to claim 3, wherein the turning means is firmly connected to the lower part.

5. The unicycle according to claim 2, wherein the turning means is formed as a handlebar arranged in the axis of the rotational connection.

6. The unicycle according to claim 2, wherein the turning means is formed as a handlebar arranged offset to the axis of the rotational connection.

7. The unicycle according to claim 6, wherein the turning means is connected with the lower part by a crank mechanism.

8. The unicycle according to claim 1, wherein between the lower part and the upper part a spring element is arranged, the spring element has one end firmly connected with the upper part and the other end is firmly connected with the lower part.

9. The unicycle according to claim 8, wherein the spring element is formed as a torque spiral spring.

10. The unicycle according to claim 1, wherein between the lower part and the upper part a damping element is arranged, the damping element has one end firmly connected with the upper part and the other end is firmly connected with the lower part.

11. The unicycle according to claim 10, wherein the damping element is formed as a fluid damper.

12. The unicycle according to claim 1, wherein the rotational connection angle is $0°<\alpha<45°$.

13. The unicycle according to claim 12, wherein the rotational connection angle is $15°<\alpha<25°$.

* * * * *